Figure 1:
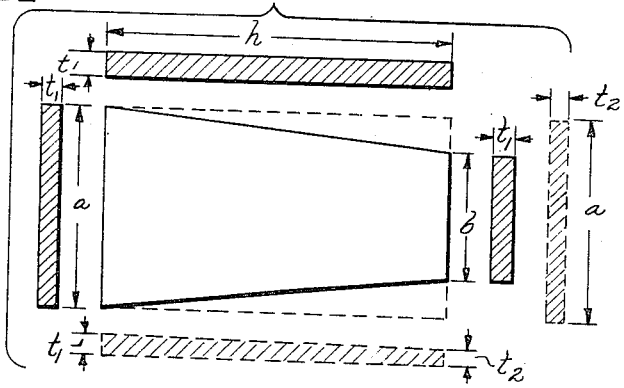

Aug. 14, 1956

H. J. ALTWICKER 2,758,369

METHOD AND APPARATUS FOR PRODUCING
TAPERED STRUCTURAL ELEMENTS

Original Filed April 27, 1950

2 Sheets-Sheet 1

INVENTOR.
HUBERT J. ALTWICKER
BY Wade Koontz AND
Frederick W. Cotterman
ATTORNEYS Aug. 14, 1956  H. J. ALTWICKER  2,758,369
METHOD AND APPARATUS FOR PRODUCING
TAPERED STRUCTURAL ELEMENTS
Original Filed April 27, 1950  2 Sheets-Sheet 2
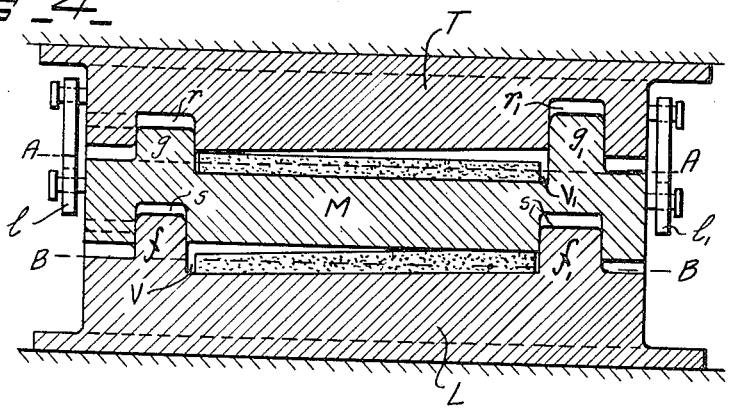
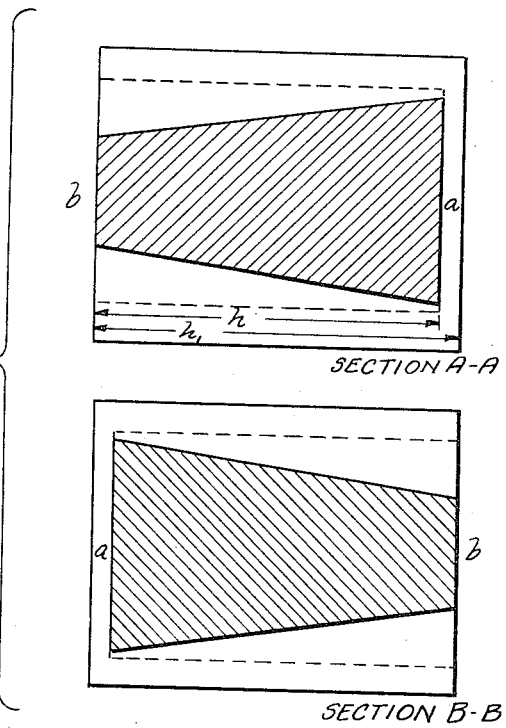
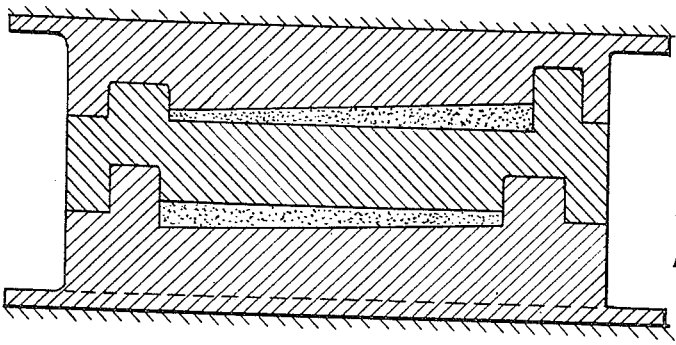
INVENTOR.
HUBERT J. ALTWICKER
BY Wade Koonty AND
Frederick W. Cotterman
ATTORNEYS

United States Patent Office 2,758,369

Patented Aug. 14, 1956

2,758,369

METHOD AND APPARATUS FOR PRODUCING TAPERED STRUCTURAL ELEMENTS

Hubert J. Altwicker, Dayton, Ohio

Continuation of abandoned application Serial No. 158,581, April 27, 1950. This application February 25, 1953, Serial No. 338,930

7 Claims. (Cl. 29—552)

(Granted under Title 35, U. S. Code (1952), sec. 266)

The invention described herein may be manufactured and used by or for the Government for governmental purposes without payment to me of any royalty thereon.

This invention relates to a method of and apparatus for producing tapered sheet elements by a forging process to eliminate the difficulties presented in industry in their present manufacture by a rolling process. The tapered sheet element is particularly important to the aircraft industry which requires components of advanced design involving tapered structural sections. This application is a continuation of application Serial Number 158,581, filed April 27, 1950, now abandoned, which application is directed to a Method of Manufacturing Tapered Items.

The process now being used in industry produces tapered sheet elements by rolling, during which rolling an electrically operating gearing device changes the pitch of the rolls as the sheet blanks are passing through. This rolling process, however, presents a difficult problem resulting from the fact that the tapered sheet elements so obtained must be straightened and flattened after quenching whereby unavoidable stresses and strains result. In the tapered sheet elements so produced these undue stresses and strains, of course, are highly objectionable, particularly as applied to aircraft structures of advanced design.

The method and apparatus which is the subject of this invention involves the cutting of trapezoidal blanks of sheet material of predetermined shape and size then introducing them to a forging apparatus of novel construction employing multiple-tiered dies to produce tapered sheet elements of rectangular outline with an absence of the undesirable stresses and strains inherent in their production when utilizing a rolling process. Moreover, the improved process which is the subject of this invention produces the tapered sheet elements with low cost, and a minimum waste of material, and rapidly, being readily adaptable to high production methods. It is noted that the same forging apparatus which produces the tapered sheet elements of rectangular outline may be used for straightening and flattening the sheet elements so produced after quenching, eliminating any undue handling which might result in undue stresses and strain as well as resulting in considerably decreased cost.

An object of this invention is to provide an improved process of producing tapered sheet structural elements of high quality.

Another object of this invention is to provide a novel and improved apparatus for producing tapered sheet structural elements by forging.

A further object of this invention is to produce a low cost, high quality production method of producing tapered sheet structural elements for aircraft of advanced design.

Figure 2:
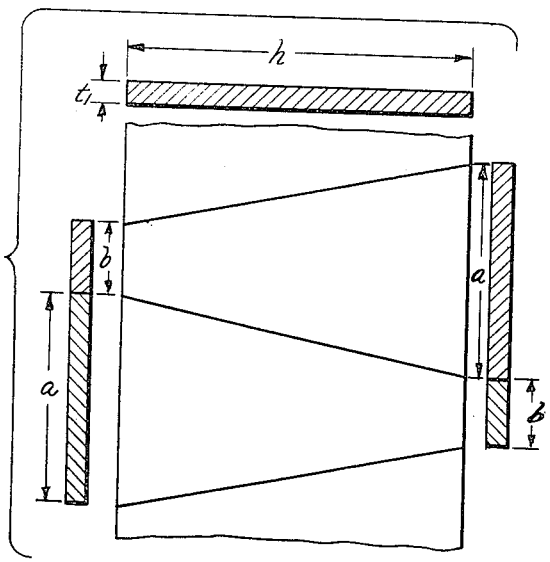

Other objects and applications of this invention will be readily apparent to those skilled in the art from the following specification taken in conjunction with the accompanying drawings wherein:

Fig. 1 includes a plan, side and two end views of an original blank of isosceles trapezoidal outline which may be cut from a larger sheet of uniform thickness as shown in Fig. 2 with the right and left end views and a side view all in solid lines, the dimensions to which the blank is to be formed by forging being shown in dotted lines.

Fig. 2 shows how the original isosceles-trapezoidal blanks may be cut from sheet stock of predetermined width and uniform thickness without waste, the showing being only of a fragmentary section of a sheet.

Figure 3:
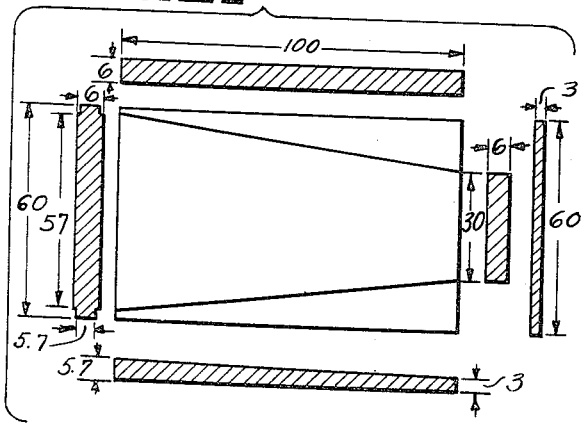

Fig. 3 explains by numerical example how the wider end of an isosceles-trapezoidal blank may preferably be made slightly less in the blank than in the completed article when it is desired to thereafter slightly reduce the thickness of the blank at the wide end in the forging process to avoid grain growth in annealing.

Fig. 4 shows a side view of a multiple-tier die shown loaded but still in the open position.

Fig. 5 discloses how the blanks of a two-tier die may preferably be placed in the die to avoid longitudinal flow when performing the forging operation.

Fig. 6 shows the same die as seen in Fig. 4 but in the closed position.

Like reference characters refer to like parts throughout the several views.

Referring to the drawings, and more particularly to Fig. 1, a blank is first provided having a length $h$, widths $a$ and $b$ at the wide and narrow ends respectively, and a uniform thickness $t$, throughout. This blank is to be processed by a forging operation into rectangular outline wherein length $h$ and width $a$ are substantially unchanged but wherein the end $b$ is widened to the dimension $a$ and the blank is tapered in thickness from $t_1$ to $t_2$. The full lines show the blank before forging and the dotted lines show the completed article.

In order that the completed article may be rectangular and have the desired taper in thickness, the volumes of the isosceles trapezoidal blank and of the resulting rectangular sheet must be equal.

The volume $V_1$ of the trapezoidal blank is:

$$V_1 = \frac{a+b}{2} h t_1$$

and the volume of $V_2$ of the resulting rectangular sheet is:

$$V_2 = ah \frac{t_1+t_2}{2}$$

$$V_1 = V_2$$

$$\frac{a+b}{2} h t_1 = ah \frac{t_1+t_2}{2}$$

$$at_1 + bt_1 = at_1 + at_2$$

$$bt_1 = at_2$$

Finally the following proportion results:

$$\frac{a}{b} = \frac{t_1}{t_2}$$

The foregoing equations enable one to determine the dimension $b$ when $a$, $t_1$ and $t_2$ are known, or the dimension $t_2$ when $a$, $t_1$ and $b$ are known.

In the transformation illustrated in Fig. 1, the crystals of the blank move transversely. The section $at_1$ on the left side of Fig. 1 remains substantially unchanged while the section $bt_1$ on the right side is changed to conform to a dimension $at_2$ so that a sheet of equal width but tapered in thickness results. To accomplish this result, however, it is necessary to provide some means to restrain longitudinal flow of the material. This can be done by proper tooling as hereinafter described.

Fig. 2 shows a method whereby isosceles-trapezoidal blanks of end dimensions $a$ and $b$ and length $h$ may be cut without waste from a reel of ribbon stock or plates of width $h$ and thickness $t_1$ or from strips of width $h$ and thickness $t_1$ and of maximum commercially procurable length. In this cutting blanks from ribbon stock the flow of material is transversely of the axis of the blank but in the direction of the grain in the ribbon or plate. Where for any reason this is found objectionable, the blank axes may be made to correspond to the grain in the stock.

In practicing the present invention it is necessary to consider the possible appearance of local grain growth after annealing caused by critical degrees of deformation. To avoid such a result it is advisable to so form and dimension the blank that a reduction of a minimum of five percent in thickness over the entire blank area will be effected. That this may be readily accomplished may be seen by reference to Fig. 3. Here it is desired that the finished slab at the left end be 60 x 5.7 mm.=342 sq. mm. in cross section. The blank, at the left end, is therefore made 57 x 6 mm.=342 sq. mm. then is compressed to 60 x 5.7=342 sq. mm. in the forging operation. Thus there is no part of the area of the completed rectangular tapered slab which has been reduced in thickness less than five percent and the surfaces of the slab will not be subject to local grain growth after annealing.

It is well settled that, in making forgings, the required pressures are a function of the minimum wall thickness of the forgings, and it has been found extremely difficult to forge parts, having thin walls on one end and thicker walls on the other, to accurate size if the distribution of pressure over the press table is not uniform.

In order to insure a field of equal pressure on the table of a hydraulic press, such as is usually employed in making forgings of the character herein shown and described, it is found practicable in some cases to form two or more elements side by side in a die, as, for example, two propeller blades side by side or hub head on hub. In this way production of precision-forged parts could be increased. However, such an arrangement enlarges the area to be covered by the working pressure considerably whereby the specific pressure (p. s. i.) is reduced.

Fig. 4 shows an example of novel multiple-tiered die which may be constructed to obtain equally distributed pressure over the entire forging area. The die consists of three components, the upper component T being adapted for attachment to the ram of the forging press and the lower component L to the platen. The middle component M is maintained in alignment with the upper and lower components T and L by guide lugs $f$ and $f_1$ and $g$ and $g_1$ which are slidable vertically in slots $r$ and $r_1$ and $s$ and $s_1$. Slotted links $l$ and $l_1$ enable the die, on the upstrike of the ram, to first lift the upper component T off the middle component M, then lift the middle component M off the lower component L. The several components of the die are thus spread sufficiently for insertion of the isosceles-trapezoidal blanks.

Sections A—A and B—B of Fig. 4 show the upper and lower isosceles-trapezoidal blanks correctly placed in the die preparatory to the execution of the forging operation. The upper blank is placed as seen in Fig. 5, i. e., with the narrow end $b$ to the left and against the lug $g$, Fig. 4, while the lower blank is placed, also as seen in Fig. 5, i. e., with the narrow end $b$ to the right and against the lug $f_1$, Fig. 4. With the blanks so placed, there are spaces V and $V_1$ equal to about five percent of the length of the blank between the wide end of the upper blank and the lug $g_1$, and between the wide end of the lower blank and the lug $f$. By this arrangement the blanks are locked against longitudinal flow. The spaces left at V and $V_1$ are necessary to permit easy entry of the blanks in the die.

By inspection of Fig. 4 it will be seen that, at the beginning of the forging stroke, the pressure being applied is divided equally between the narrow end $b$ of the upper blank alongside the lug $g$ and the narrow end $b$ of the lower blank alongside the lug $f_3$, whereby pressure distribution is balanced.

In Fig. 6, the die is shown closed, and the vertical cross sections through the slab which in Fig. 4 are of equal thickness throughout their length are now longitudinally tapered the one opposite the other, and the horizontal cross sections which in Fig. 5 are shown in full lines as a symmetrical or isosceles trapezoid will, after the forging operation of Fig. 6, be rectangular as seen in the dotted lines of Fig. 5.

While in the foregoing a two-tier die is suggested and illustrated, it will be apparent that the same principal may be employed to a multiple-tier die having any reasonable number of tiers. An even number of blanks should, however, be employed if equal pressure distribution over the press platen is to be achieved. It can be readily seen that such novel apparatus can readily provide high production methods for producing tapered elements rapidly with a minimum expense.

In practice it may be advantageous to provide internal electric heating within the die components since forging of this character is preferably done at high temperatures. This is especially true when thin wall thicknesses are to be produced.

It will be understood that the slab to be forged must be heated prior to being disposed in the dies for forging. The forging temperature at which the slab is heated depends on the material of the slab. After the tapered slab is forged and subsequently quenched, it may be immediately returned to the die, Fig. 6, and straightened. This may be done at room temperature by a coining process whereby a flat surface, free from "oil-canning" is achieved. In this manner, no additional apparatus such as stretchers or straighteners is necessary, in forging with my novel apparatus and method, for straightening the tapered elements and undue handling is eliminated.

The herein disclosed method comprises producing rectangular slabs which are tapered in thickness by first producing an isosceles-trapezoidal blank of uniform thickness, then, by a single forging operation, changing the isosceles-trapezoidal outline of the blank to a rectangular outline and the thickness of the blank from uniform to tapered. This method is believed to be novel and useful.

Other advantageous features consist of so cutting the blank with reference to the sheet stock that the subsequent deformation will produce flow of the metal transverse to the grain, and so locating the blanks in the die as to eliminate longitudinal metal flow.

Additionally the method of achieving equal distribution of pressure over the entire surface in a two-tier die by turning one blank end for end with respect to the other is considered a valuable feature of the invention.

While a single embodiment and application of the invention has been set forth herein, other embodiments and applications thereof will be readily apparent to those versed in the art.

What I claim is:

1. Apparatus for forging uniform stress free tapered structural elements comprising a plate adapted for attachment to the ram of a forging press having a central portion tapered in cross section bounded by parallel guide slots to either side thereof, a second plate adapted for attachment to the platen of the press and having a central portion tapered in a direction complementary to the tapered portion of the first plate and aligned therewith and bounded by parallel lug members, a third plate interposed between said first and second plates and having on its respective faces matching guide lugs and slots respectively aligned with and interengaging the guide slots and lugs on the first and second plates and link means operatively interconnecting the first and third plates respectively whereby on insertion of uniform thickness trapezoidal sheet elements in end reversed relationship intermediate the first and third and second and third plates respectively and forging, rectangular tapered sheet elements obtain.

2. Apparatus for forging tapered rectangular sheet structural elements having multiple tiered dies, comprising an even number of complementary dies having oppositely disposed portions of tapered cross-section, each pair of said dies having interposed therebetween and aligned with the respective pairs of tapered sections a die member having a respectively opposed portion of substantially rectangular cross-section, the die members having mating guide means, and means interconnecting said die members whereby on insertion of trapezoidal sheet members of uniform thickness intermediate opposed die members, and forging, a plurality of uniform rectangular tapered sheet elements obtain.

3. Apparatus for producing tapered sheet structural elements by forging comprising multiple tiered die members, means supporting the die members to provide spaces therebetween of tapered cross-section end reversed in successive fashion vertically, guide means connecting the respective tiered die members for vertical movement relative to each other whereby on insertion of sheet elements of uniform thickness in, the spaces between the respective die members and forging a plurality of uniform tapered sheet elements obtain.

4. A method of producing tapered sheet structural elements by forging employing die members comprising cutting sheet or ribbon metallic material of uniform thickness into elements of uniform isosceles trapezoidal shape, arranging the die members in multiple tiered fashion so as to provide uniform openings of tapered cross section therebetween successively in opposite directions with the respective die members relatively and uniformly movable with respect to each other, inserting the uniform isosceles trapezoidal shaped elements in the successive openings with the narrowest end portion of each element in the smallest tapered portion of each opening, restraining the elements from longitudinal movement and flow within the die members, and applying pressure through the die members substantially simultaneously to opposed sides of the elements in successive relation whereby substantially uniform tapered sheet structural elements obtain resulting in a balanced relationship of mechanical properties of said elements in longitudinal and transverse sense.

5. A method of producing tapered sheet structural elements by forging employing die members comprising cutting sheet or ribbon metallic material of uniform thickness into sheet elements of uniform isosceles trapezoidal shape, arranging the die members in tiered relatively movable complementary fashion so as to provide tiered uniform openings therebetween tapered in cross section successively in opposite directions, inserting the trapezoidal sheet elements of uniform thickness in each respective opening with the narrowest end portion of each element in the smallest tapered portion of each opening, restraining the elements from longitudinal movement and flow within the die members, and substantially simultaneously applying pressure through the die members to each successive element at successively alternate sides thereof whereby a plurality of uniform tapered sheet structural elements obtain resulting in a balanced relationship of mechanical properties of said elements in longitudinal and transverse sense.

6. A method of producing tapered rectangular sheet elements by forging employing die members comprising cutting sheet or ribbon lengths of metallic material of uniform thickness into uniform isosceles trapezoidal shaped elements, arranging the die members in tiered relatively movable spaced fashion to provide spaces therebetween of tapered cross section, heating the uniform trapezoidal shaped elements to their forging temperature, inserting the uniform trapezoidal shaped elements in the spaces therebetween successively in end reversed fashion with the narrowest end portion of each element in the smallest tapered portion of each space, restraining the elements from longitudinal movement and flow within the die members, applying pressure simultaneously through the die members to each successive trapezoidal element at successively opposite sides thereof, removing the tapered rectangular sheet elements so formed, quenching, and applying pressure thereto whereby a plurality of tapered rectangular sheet elements free of undue stress and strain obtain resulting in a balanced relationship of mechanical properties of said elements in longitudinal and transverse sense.

7. A method of producing tapered sheet structural elements by forging employing die members comprising cutting sheet or ribbon metallic material of uniform thickness into elements of uniform isosceles trapezoidal shape, arranging the die members in multiple tiered fashion so as to provide uniform openings of tapered cross section therebetween, heating the uniform trapezoidal shaped elements to their forging temperature, inserting the uniform trapezoidal shaped elements in the successive tiered openings successively in end reversed fashion with the narrowest end portion of each element in the smallest tapered portion of each opening, restraining the elements from longitudinal movement and flow within the die members, applying pressure substantially simultaneously through the die members to opposed sides of the members in successive fashion, removing the respective tapered sheet structural elements so formed, quenching, and replacing the members so formed respectively between the tiered die members and uniformly applying pressure thereto whereby a plurality of substantially identical tapered sheet structural elements free of undue stress and strain obtain resulting in a balanced relationship of mechanical properties of said elements in longitudinal and transverse sense.

References Cited in the file of this patent
UNITED STATES PATENTS

| | | |
|---|---|---|
| 101,942 | Taylor | Apr. 12, 1870 |
| 118,264 | Palmer et al. | Aug. 22, 1871 |
| 1,808,467 | Langford | Jan. 2, 1931 |
| 2,141,576 | Warr et al. | Dec. 27, 1938 |
| 2,353,975 | Soule | July 18, 1944 |